United States Patent
Strelbisky et al.

(10) Patent No.: US 7,641,849 B2
(45) Date of Patent: Jan. 5, 2010

(54) INJECTOR FOR INJECTING PARTICULATE MATERIAL INTO METALLURGICAL FURNACES

(75) Inventors: Michael J. Strelbisky, Burlington (CA); Athanasios Tommy Balkos, Mississauga (CA); Timothy Zeien, Little Mountain, SC (US)

(73) Assignee: A.H. Tallman Bronze Company, Limited, Burlington, ON (CA)

( * ) Notice: Subject to any disclaimer, the term of this patent is extended or adjusted under 35 U.S.C. 154(b) by 286 days.

(21) Appl. No.: 11/785,597

(22) Filed: Apr. 19, 2007

(65) Prior Publication Data
US 2009/0091068 A1   Apr. 9, 2009

Related U.S. Application Data

(60) Provisional application No. 60/795,650, filed on Apr. 28, 2006.

(51) Int. Cl.
  *C21C 7/00* (2006.01)
(52) U.S. Cl. .................................... 266/216
(58) Field of Classification Search ............. 266/216
  See application file for complete search history.

(56) References Cited

U.S. PATENT DOCUMENTS

| | | | | |
|---|---|---|---|---|
| 4,002,372 A | * | 1/1977 | Edwards et al. | 406/94 |
| 5,649,325 A | * | 7/1997 | Garrison et al. | 588/320 |
| 6,322,610 B1 | * | 11/2001 | Pavlicevic et al. | 266/222 |

* cited by examiner

*Primary Examiner*—Scott Kastler

(57) ABSTRACT

An injector for injecting particulate material into a metallurgical furnace has a first tubular barrel and a housing defining a chamber having an inlet for particulate material, a first gas inlet and a particulate material/gas outlet connected to the rear end of the first barrel. The first air inlet has a first nozzle operable to inject gas into the chamber at a supersonic velocity when gas at suitable pressure is passed through the nozzle. A second tubular barrel surrounds the first barrel in spaced relationship therewith. The second barrel has a second gas inlet adjacent its rear end and a second nozzle adjacent its front end. Gas under pressure supplied to the second gas inlet passes between the barrels and is discharged at supersonic velocity from the front end thereof adjacent gas and entrained particulate material discharged from the first barrel so as to shroud the particulate material.

6 Claims, 1 Drawing Sheet

"Tallman Supersonic Carbon Injector – Operational Schematic"
Sketch created:

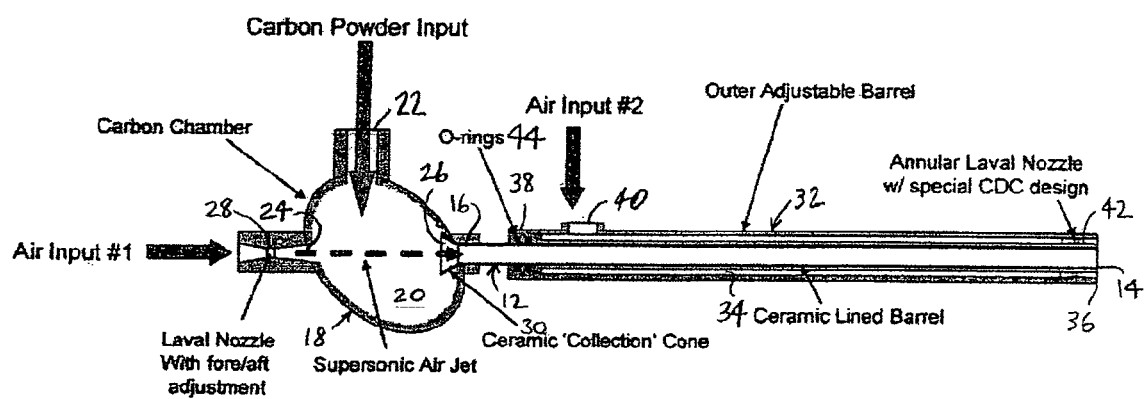
Figure 1: "Tallman Supersonic Carbon Injector – Operational Schematic"
Sketch created:

INJECTOR FOR INJECTING PARTICULATE MATERIAL INTO METALLURGICAL FURNACES

RELATED APPLICATION

This application claims priority from U.S. Provisional Patent Application 60/695,650 filed Apr. 28, 2006.

FIELD OF INVENTION

The present invention relates to injectors for injecting particulate material into metallurgical furnaces. The particulate material may be for example carbon powder and the metallurgical furnaces may for example be smelters, electric arc furnaces or steel ladles.

BACKGROUND OF THE INVENTION

In present day metallurgical furnaces, particulate material such as carbon powder is injected into a melt at subsonic speeds through a so-called straight pipe. Unfortunately, with such an injector, a substantial amount of the particulate material becomes entrained in an off-gas suction system and is thus lost.

It is therefore an object of this invention to provide an improved carbon powder injector which reduces the amount of lost particulate material.

SUMMARY OF THE INVENTION

The present invention provides an injector for injecting particulate material into a metallurgical furnace, the injector having:
- a first elongated tubular barrel having a front end and a rear end,
- a housing defining a chamber having an inlet for particulate material, a first gas inlet and a particulate material/gas outlet connected to the rear end of the first barrel,
- the first air inlet having a first nozzle operable to inject gas into the chamber at a supersonic velocity when gas at suitable pressure is passed through the nozzle, said first gas inlet being positioned so as to direct gas at supersonic velocity through the chamber to the outlet thereof so as to entrain particulate material while traveling through the chamber and then through the first barrel to cause the entrained particulate material to be discharged from the front end of the barrel, and
- a second elongated tubular barrel surrounding the first barrel in spaced relationship therewith and having a front end and a rear end, the front end of the second barrel being adjacent the front end of the first barrel, the second barrel having a second gas inlet adjacent its rear end and a second nozzle adjacent its front end whereby gas under pressure supplied to the second gas inlet passes between the first and second barrels and is discharged at supersonic velocity from the front end thereof adjacent the gas and entrained particulate material discharged from the front end of the first barrel so as to shroud the particulate material.

The outlet from the chamber may be a conical portion tapering in the direction of flow of the particulate material/gas flow to facilitate passage of the particulate material/gas flow from the chamber to the first barrel.

The first nozzle may be adjustable in a forward/rearward direction relative to gas flow therethrough to optimize the flow of gas into the chamber. The second nozzle may be adjustable in a forward/rearward direction relative to the second barrel to optimize gas flow from the front end of the second barrel. The gas flow between the first and second barrels may also function to cool the first barrel.

The first barrel may have a lining of abrasion resistant material. The lining may be a ceramic lining. The second barrel may be made of thermally conductive material, such as copper.

The chamber inlet for particulate material may be positioned such that the particulate material passes into the chamber in a direction substantially perpendicular to the direction of travel of supersonic gas passing from the first inlet to the second outlet.

The first nozzle may be adjustable in a forward/rearward direction relative to gas flow therethrough to optimize the flow of gas into the chamber. The second nozzle may be adjustable in a forward/rearward direction relative to the second barrel to optimize gas flow from the front end of the second barrel.

DESCRIPTION OF THE DRAWINGS

One embodiment of the invention will now be described, by way of example, with reference to the accompanying drawing, in which:

FIG. 1 is a diagrammatic side view of a carbon powder injector in accordance with a preferred embodiment of the invention.

DESCRIPTION OF PREFERRED EMBODIMENT

Referring to the drawings, a carbon powder injector for an electric arc furnace has a first elongated tubular barrel 12 with a front end 14 and a rear end 16. The first barrel 12 has a lining of abrasive resistant material, such as a ceramic lining. The injector also has a housing 18 defining a carbon powder chamber 20 having an inlet 22 for carbon powder, a first gas inlet 24 and a carbon powder/gas outlet 26 which is connected to the rear end of the first barrel 12. The carbon powder inlet 22 is positioned so as to direct the carbon powder into the chamber 20 at any suitable angle, for example in a direction perpendicular to the direction of flow of gas from the first inlet 24 to the outlet 26.

The gas inlet 24 has a first nozzle 28 in the form of a Laval nozzle operable to inject gas into the carbon powder chamber 20 at a supersonic velocity, for example about Mach 2, when gas at a suitable supply pressure is passed through the nozzle 28. The gas inlet 24 is positioned so as to direct gas at supersonic velocity through the carbon powder chamber 20 to the outlet 26 so as to entrain carbon powder therein and cause the entrained carbon powder to be passed along the first barrel 12 and be discharged from the front end 14 thereof.

The nozzle 28 may be adjustable in a forward/rearward direction relative to the direction of air therethrough to optimize the flow of gas into the carbon powder chamber 20. The outlet 26 from the carbon powder chamber 20 has a conical portion 30 tapering in the direction of the carbon powder/gas flow to facilitate passage of the carbon powder/gas from the carbon powder chamber 20 to the first barrel 12.

A second elongated tubular barrel 32 made of a thermally conductive material such as copper surrounds the first barrel 12 in spaced relationship therewith to form an annular passage 34 between the second barrel 32 and the first barrel 12. The second barrel 32 extends along most of the length of the first barrel 12, the front end 36 of the second barrel 32 being adjacent the front end 14 of the first barrel 12 and the rear end 38 of the second barrel 32 being near the rear end 16 of the first barrel 12.

The second barrel 32 has a second gas inlet 40 adjacent its rear end 38 and a second nozzle 42 adjacent its front end 36. The second nozzle 42 is a CDC (Converging/Diverging/Converging) annular Laval nozzle. The rear end of the annular passage 34 may be welded in place or sealed by O-rings 44 carried by the second barrel 32 and engaging the first barrel 12. gas under pressure supplied to the second air inlet 40 passes along the annular passage 34 and through the nozzle 42 and is discharged at supersonic velocity as an annular jet from the front end 36 of the second barrel 32 surrounding the carbon powder/gas jet discharged from the front end 14 of the first barrel 12. The second nozzle 42 may be adjustable in a forward/rearward direction relative to the length of the first and second barrels 12, 32 to optimize the gas flow from the front end of the outer barrel 32.

The carbon powder is mostly shrouded by the gas to prevent the carbon powder from spreading and losing momentum. The gas supplied to inlet 40 functions primarily to shroud the carbon powder although some carbon powder does become entrained therein.

The gas flow along the annular passage 34 also serves to cool the first barrel so that liquid cooling thereof is not required.

Gas flow to the inlet nozzle 28 may for example be at a pressure in the range of from about 50 to about 200 psi with a flow rate in the range of from about 30 to about 20,000 scfm. Gas flow to the second inlet 40 may for example be at a pressure in the range of from about 50 to about 200 psi with a flow rate in the range of from about 50 to about 20,000 scfm.

The gas supplied to the inlet nozzle 28 may be an inert gas such as nitrogen or argon or may be air. The preference is for air or nitrogen. The gas supplied to the second inlet 40 may be an inert gas or a non-inert gas, for example nitrogen, argon, air, oxygen, or natural gas. The preference is for air oxygen or nitrogen.

In stead of being ceramic, the lining of the first barrel 12 may be of any suitable abrasion resistant material, such as a suitable alloyed steel. Also, instead of being copper, the second barrel 32 may be of any suitable thermally conductive material, for example alloys such as aluminum bronze or other suitable aluminum alloy.

The advantages of the invention and other embodiments thereof will now be readily apparent to a person skilled in the art from the foregoing description, the scope of the invention being defined in the appended claims.

The invention claimed is:

1. An injector for injecting particulate material into a metallurgical furnace, the injector comprising:
   a first elongated tubular barrel extending between a front end and a rear end thereof;
   a housing defining a chamber comprising:
      a particulate material inlet through which the particulate material enters the chamber;
      a first gas inlet;
      an outlet in fluid communication with the rear end of the first barrel;
   a first nozzle operable to inject gas through the first gas inlet into the chamber at a supersonic velocity when gas at suitable pressure is passed through the nozzle, said first gas inlet being positioned so as to direct said gas at supersonic velocity through the chamber to the outlet thereof, said gas entraining the particulate material as the gas moves through the chamber and through the first barrel and discharging the entrained particulate material from the front end of the barrel;
   a second elongated tubular barrel surrounding the first barrel in spaced relationship therewith extending between a front end and a rear end thereof the front end of the second barrel being disposed proximal to the front end of the first barrel; and
   the second barrel comprising a second gas inlet adjacent its rear end and a second nozzle adjacent its front end whereby gas under pressure supplied to the second gas inlet passes between the first and second barrels and is discharged at supersonic velocity via the second nozzle from the front end thereof adjacent the gas and entrained particulate material discharged from the front end of the first barrel to shroud the particulate material as it is discharged from the front end of the first barrel, the second barrel being made of copper.

2. An injector for injecting particulate material into a metallurgical furnace, the injector comprising:
   a first tubular barrel extending between front and rear ends thereof;
   a housing defining a chamber therein;
   a first nozzle for injecting a first gas into the chamber;
   the chamber comprising:
      a first gas inlet through which the first gas exiting the first nozzle enters the chamber at a first predetermined flow rate and a first predetermined velocity;
      a particulate material inlet through which the particulate material enters into the chamber, for entrainment of the particulate material with the first gas;
      an outlet in communication with the rear end of the first barrel through which the first gas and the entrained particulate matter passes into the first barrel, to exit therefrom at the front end;
   a second tubular barrel coaxial with the first barrel to define an annular passage therebetween, the second barrel extending between a rear end thereof positioned proximal to the rear end of the first barrel and a front end thereof positioned proximal to the front end of the first barrel;
   a second nozzle positioned between the first and second barrels proximal to the front ends thereof; and
   the second barrel comprising a second gas inlet proximal to the rear end thereof through which a second gas is injected at a second predetermined flow rate, such second gas being directed by the annular passage to exit therefrom via the second nozzle at a second predetermined velocity to shroud the first gas and entrained particulate matter exiting the first barrel.

3. An injector according to claim 2 in which:
   the first gas and the entrained particulate material exit the front end of the first barrel at an exit velocity; and
   the second predetermined velocity is at least approximately equal to the exit velocity.

4. An injector according to claim 2 in which the first nozzle is positionable relative to the first gas inlet for adjusting the first flow rate of the first gas into the chamber.

5. An injector according to claim 2 in which the second nozzle is positionable relative to the front end of the second barrel for adjusting the second flow rate of the second gas as it exits the annular passage.

6. An injector according to claim 2 in which the chamber additionally comprises a conical portion to facilitate passage of the first gas and the entrained particulate material into the first barrel.

* * * * *